United States Patent

[11] 3,625,380

[72] Inventor Albert L. Anderson
West Des Moines, Iowa
[21] Appl. No. 30,148
[22] Filed Apr. 20, 1970
[45] Patented Dec. 7, 1971
[73] Assignee Mid-America Body & Equipment Co., Inc.
West Des Moines, Iowa

[54] APPARATUS FOR LOADING REELS
1 Claim, 10 Drawing Figs.
[52] U.S. Cl............................................................. 214/77,
214/130 C
[51] Int. Cl......................................................... B60p 1/48
[50] Field of Search............................................ 214/77, 78,
80, 620, 130, DIG. 4, DIG. 3

[56] References Cited
UNITED STATES PATENTS
3,165,214  1/1965  Young............................ 214/77

2,582,663  1/1952  Weiss............................ 214/620
3,021,021  2/1962  Warren......................... 214/77
3,063,584  11/1962  Fleischer et al.............. 214/77
3,184,082  5/1965  Hall.............................. 214/77

Primary Examiner—Gerald M. Forlenza
Assistant Examiner—Robert J. Spar
Attorney—Rudolph L. Lowell ABSTRACT: A series of three transversely spaced lift arms are mounted on a common transverse rock shaft carried at the rear end of a portable frame for movement between a first position projected rearwardly and downwardly from the frame to a second position projected upwardly and forwardly above the frame. The center one of the lift arms is releasably secured to the rock shaft at a position spaced equidistantly from each of the outer lift arms to provide for a small reel being loaded by the center lift arm and one of the outer lift arms. On removal of the center lift arm a large reel is loaded by the outer two arms.

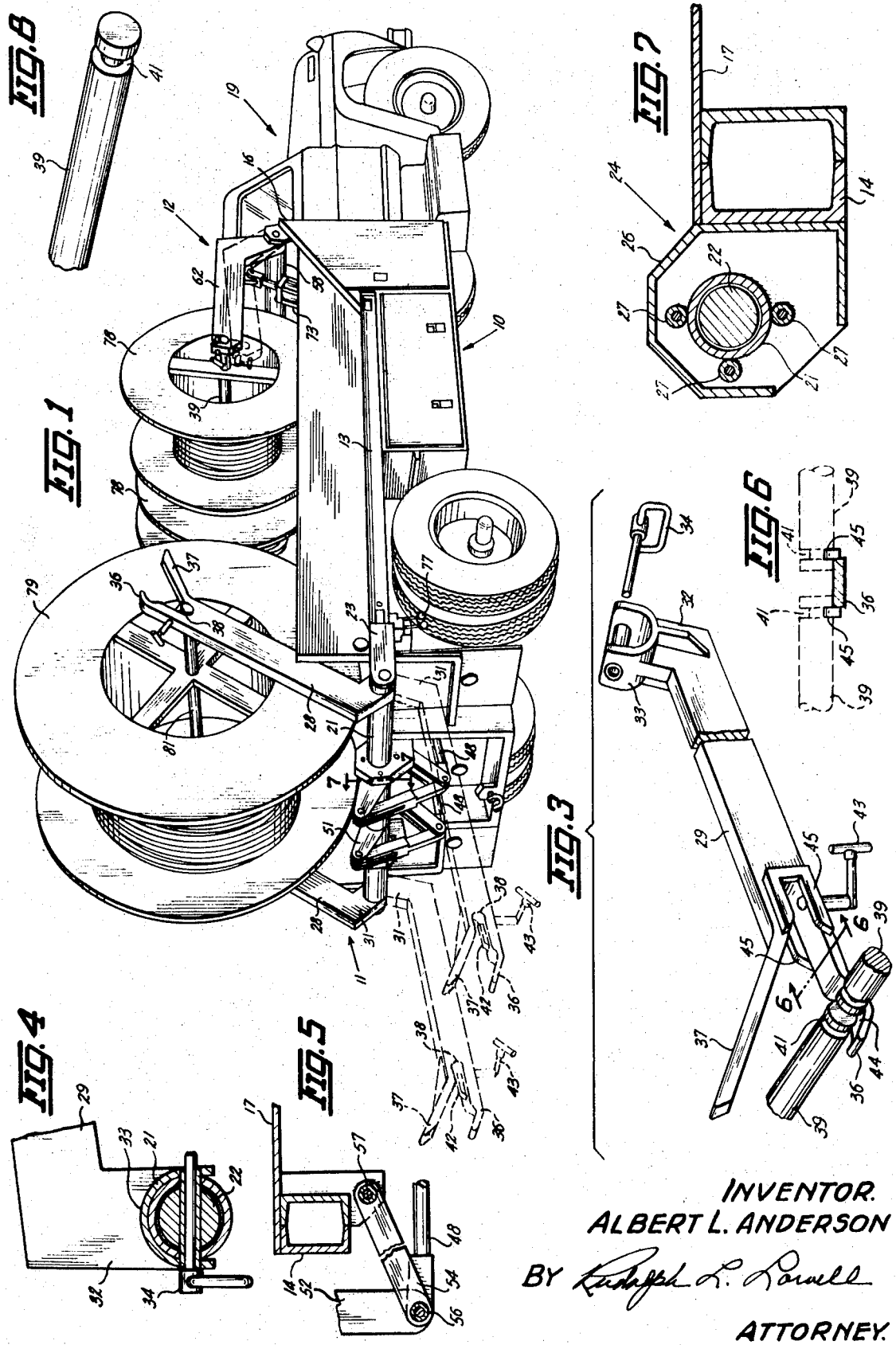

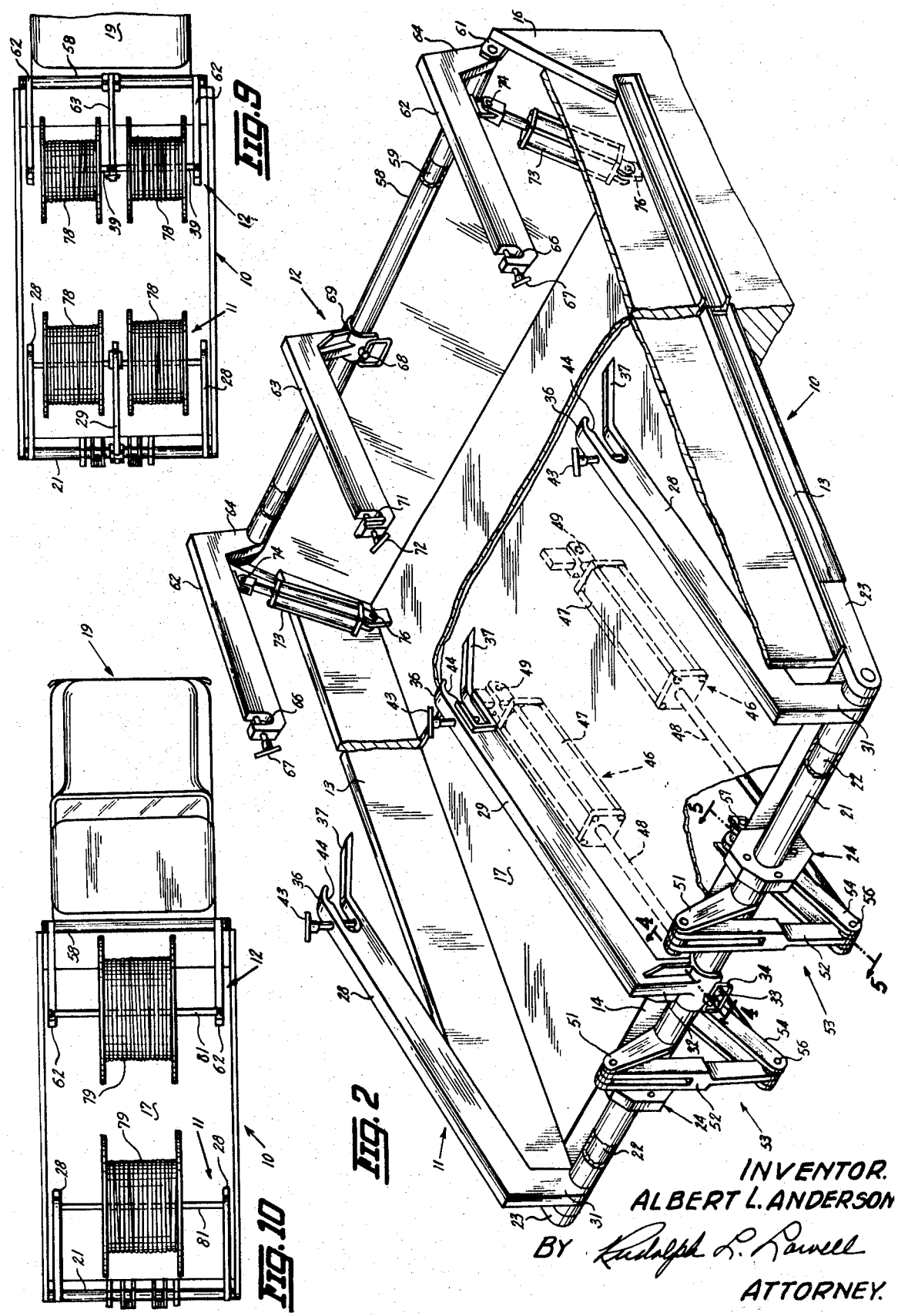

3,625,380

APPARATUS FOR LOADING REELS

SUMMARY OF THE INVENTION

The reel loader apparatus is of a simple and compact construction and efficient in operation to load either small reels or large reels in transversely centered positions on a truck-supported platform to prevent the truck turning over in a reel-loaded condition. Because of the support of the three lift arms on a common rock shaft, a pair of small reels can be simultaneously loaded in a side-by-side relation in positions at opposite sides of the longitudinal axis of the frame so as to counterbalance each other transversely of the frame. On removal of the center lift arm a single large reel or a small reel can be loaded in a centered position transversely of the frame. With the platform of a length to hold a pair of large reels in an end-to-end relation, the reel loader apparatus is capable of loading either four small reels; two large reels; or one large reel and two small reels relatively arranged in centered positions transversely of the truck. Truck stability against turning over is thus maintained at all times under all reel loaded conditions.

BRIEF DESCRIPTION OF THE DRAWINGS

FIG. 1 is a perspective view of the reel loader apparatus of this invention shown in assembly relation with a truck;

FIG. 2 is an enlarged foreshortened rear perspective view of the reel loader apparatus;

FIG. 3 is a foreshortened perspective view of a detachable center lift arm that forms part of the reel loader apparatus;

FIG. 4 is an enlarged sectional detail view taken on line 4—4 in FIG. 2;

FIG. 5 is a detail sectional view on the line 5—5 in FIG. 2;

FIG. 6 is an enlarged detail sectional view as seen on line 6—6 in FIG. 3;

FIG. 7 is an enlarged detail sectional view on the line 7—7 in FIG. 1;

FIG. 8 is an enlarged perspective view of the end portion of a reel spindle;

FIG. 9 is a diagrammatic top plan view of the reel loader apparatus and truck assembly in FIG. 1 showing the loaded positions of four small reels; and FIG. 10 is illustrated similarly to FIG. 7 and shows the loaded positions of two large reels.

DETAIL DESCRIPTION OF THE INVENTION

The reel-loading apparatus of this invention is illustrated as incorporating in a unit assembly a body structure 10 having a rear reel-loading mechanism 11 and a front reel-supporting mechanism 12 (FIGS. 1 and 2). The body structure 10, which includes longitudinally extended side frame members 13, a rear transverse frame member 14, a front upright wall 16 and a deck or bottom wall 17 (FIG. 2) is adapted for mounting on the main frame or chassis of a vehicle such as a truck 19 (FIG. 1). The body structure 10 thus constitutes a portable reel-carrying frame assembly.

The reel-loading mechanism 11 (FIG. 2) includes a rock shaft 21 comprised of a cylindrically shaped tubular member that extends transversely of the platform or bottom wall 17 at a position adjacent to and rearwardly of the transverse frame member 14. The rock shaft 21 is rotatably supported on a pair of cylindrical rod members or stub shafts 22, each of which is loosely fitted within a corresponding end of the rock shaft. The outer end of each stub shaft 22 is secured to an elongated mounting bracket 23 which is connected to and projects rearwardly from an adjacent frame side member 13 of the body structure 10. The rock shaft 21 in a rotatably supported position on the stub shafts 22 extends between and in contact engagement with the mounting brackets 23 which thus function to hold the rock shaft against axial movement transversely of the body structure 10.

Intermediate its ends the rock shaft 21 is rotatably supported on a pair of axially spaced bearing units 24 (FIGS. 2 and 7) each of which includes a housing member 26 having a rear wall attached to the rear transverse frame member 14. Located within and rotatably supported on each housing member 26 are a plurality of rollers 27, illustrated as being three in number, that are spaced circumferentially about and in bearing engagement with the adjacent portion of the outer peripheral surface of the rock shaft 21. The bearing units 24 function to prevent a lateral flexing movement of the rock shaft during operation of the reel-loading mechanism 11.

Spaced equal distances apart axially of the rock shaft 21 are a plurality of lift arms 28 and 29, shown as three in number (FIG. 2). The outer lift arms 28 are arranged adjacent opposite ends of the rock shaft 21 inwardly from a corresponding mounting bracket 23, and the center lift arm 29 is located at the transverse center of the rock shaft so as to be movable in a vertical plane that extends through the longitudinal axis of the body structure 10 and in turn of the truck 19.

Each of the outer lift arms 28 includes a laterally extended end connector 31 that is secured, as by weldments, to the rock shaft 21 so as to project radially downwardly from the rock shaft when the arms 28 are projected downwardly and rearwardly from the body structure 10. The center lift arm 29 (FIGS. 3 and 4) has an end connector 32 which terminates in a curved plate member 33 adapted to receive in a mating relation a peripheral portion of the rock shaft 21. The center lift arm 29 is detachably connected to the rock shaft by a connecting pin 34 extended diametrically through the rock shaft and the outer end portions of the curved plate member 33 such that the center lift arm is positioned in a transverse plane common to the plane of the outer lift arms 28.

The free end of each of the outer lift arms 28 is of a bifurcated construction (FIGS. 1 and 2) so as to provide a reel-supporting bifurcation 36, a reel release bifurcation 37 and a spindle-receiving notch or pocket 38 at the junction of the bifurcations 36 and 37. A small reel-supporting spindle 39 (FIGS. 3 and 8) is comprised of a cylindrical rod member formed adjacent each of its ends with an annular groove 41. The bifurcation 36 for each outer lift arm 28 has an inner track member 42 (FIG. 2) that is receivable within a corresponding groove 41 to guide a small reel spindle 39 for rolling movement along the bifurcation 36 and into the notch or pocket 38. The end of a small reel spindle 39 is releasably locked within notch 38 by a spring-actuated articulated locking pin 43 that is extendible through the bifurcations 36 and 37 to open and closed positions relative to the notch 38.

The bifurcation 36 (FIGS. 1 and 2) has a curved terminal portion 44 facing the bifurcation 37 and adapted to be positioned below an end of a small reel spindle 39, for a ground-supported reel, for initially engaging the reel in a reel-loading operation. The center lift arm 29 (FIG. 3) is formed at its free end with bifurcations 36 and 37 in all respects similar to the corresponding bifurcations on the outer lift arms 28 and 29. However, the bifurcation 36 on the center lift arm 29 (FIGS. 3 and 6) has a pair of track members 45 secured to the opposite sides thereof in a spaced-parallel relation for reception within the grooves 41 on the adjacent ends of a pair of small reel spindles 39 as will appear later.

The rock shaft 21 is rocked or oscillated by means including linearly extendible power units 46 (FIG. 2) to move the lift arms 28 and 29 from a reel-loading position projected downwardly and rearwardly from the rock shaft to a reel-supporting position projected upwardly and forwardly above the deck or platform 17 of the body structure 10. The power units 46 are illustrated as being comprised of hydraulic cylinder assemblies each of which includes a cylinder 47 and an associated piston rod 48.

The hydraulic cylinder assemblies 46 (FIGS. 1 and 2) extend longitudinally of and below the deck or platform 17 of the body structure 10 in a transversely spaced relation with the piston rods 48 extendible rearwardly from the cylinders 47. The front end of the cylinders 47 are pivotally supported, as indicated at 49, from the lower side of the platform 17. Associated with each cylinder assembly 46 is a rock arm 51 on the rock shaft 21 that is pivotally connected with the free end of a corresponding piston rod 48 by a link member 52 that forms part of a linkage system indicated generally as 53 (FIG. 5). A second link member 54 of the linkage mechanism 53 is also pivotally connected at one end to the piston rod 48 by a pivot connection 56 common to the link member 52. The opposite end of the link member 54 is pivotally connected at 57 to the underside of the platform 17 at a position forwardly of the rear transverse member 14. On extension of the piston rods 48 the lift arms 28 and 29 are moved to their reel-supporting positions. When the piston rods 48 are retracted the lift arms 28 and 29 are moved to reel-loading positions.

The front reel-supporting mechanism 12 (FIG. 2) includes a tubular shaft 58 rotatably supported on stub shafts 59 having mounting brackets 61 secured to the front upright wall 16 of the body structure 10. Outer support arms 62 and a center support arm 63 are spaced axially of the tubular rock shaft 58 so as to be opposite corresponding arms 28 and 29, respectively, longitudinally of the body structure 10. Each outer support arm 62 has a laterally extended connector 64 fixedly secured to the rock shaft 58 so as to project upwardly and rearwardly therefrom when the support arms 62 are extended rearwardly from the front upright wall 16. The free end of each outer support arm 62 is formed with an upwardly facing spindle-receiving notch 66 and an associated notch-closing pin 67.

The center support arm 63 is detachably connected to the rock shaft 58 by a connecting pin 68 projected diametrically through the rock shaft 58 and through the end portions of an arcuate mounting plate 69 in all ways similar to the detachable mounting of the center lift arm 29 of the reel-loading mechanism 11. The center support arm 63, when connected to the rock shaft 58, is positioned so as to lie in a plane common to the plane of the outer support arms 62. Similarly to the outer support arms 62, the center support arm 63 is formed at its free end with a spindle-receiving notch 71 having a corresponding notch-closing pin 72.

The rock shaft 58 is oscillated by a pair of hydraulic cylinder assemblies 73 (FIG. 2) each of which has one end pivoted at 74 to an outer support arm 62 and an opposite end pivotally connected at 76 to the platform 17. On extension of the cylinder assemblies 73 the support arms 62 and 63 are moved to upwardly and rearwardly extended positions as shown in FIG. 1 for one of the support arms 62. When the hydraulic cylinder assemblies 73 are retracted the support arms 62 and 63 are moved to downwardly and rearwardly extended positions as illustrated in dotted lines in FIG. 1.

The hydraulic cylinder assemblies 46 and 73 for the reel-loading mechanism 11 and reel-supporting mechanism 12, respectively, are all of double-acting type, with oil under pressure being supplied by a pump and reservoir unit (not shown) that is mounted at the underside of the body structure 10 for operation of the pump from a power take off provided on the engine (not shown) of the truck 19. Operation of the cylinders assemblies 46 and 73 is controlled by a valve assembly 77 (FIG. 1) located adjacent the rear end and at one side of the body structure 10.

In the operation of the reel loader apparatus, let it be assumed that four small reels, indicated at 78 in FIG. 9, are to be loaded onto the truck 10. For this purpose, the center arms 29 and 63 are attached to their respective rock shafts 21 and 58. The power units 46 are then extended to move the lift arms 28 and 29 of the reel-loading mechanism 11 to their reel-loading positions, indicated in dotted lines in FIG. 1 for the outer arms 28, wherein they project downwardly and rearwardly from the body structure 10.

A first pair of the small reels 78 to be loaded are arranged in an axially aligned relation on the ground and the truck 19 is maneuvered to locate the reels 78 between the center lift arm 29 and each outer arm 28. When thus positioned the outer ends of the small reel spindles 39 are positioned above the curved end portions 44 of the outer arms 28 and their inner adjacent ends are positioned above the curved end portion of the center lift arm 29.

On manipulation of the valve control 77 to retract the power units 46, the lift arms 28 and 29 are raised and the outer ends of the small reel spindles 39 are received within the depressions of the corresponding curved end portions 44 of the lift arms 28 and 29 as illustrated for the center lift arm 29 in FIG. 3. On a continued raising of the lift arms the spindles 39 at the grooves 41 are directed into guided engagement with the tracks on the bifurcations 36, as shown for the tracks 45 on the center lift arm in FIG. 6, for movement of their ends into the corresponding sockets or notches 38. The locking pins 43 are then moved into their notch-closing positions after which the elevation of the lift arms 28 and 29 is resumed until the arms are in their reel-supporting positions projected forwardly and upwardly above the platfom 10 and wherein the lower sides of the pair of small reels 78 are adjacent to the surface of the platform or floor deck 17. The control valve assembly 77 is then operated to move the support arms 28 and 29 of the front reel-supporting mechanism 11 to positions projected rearwardly and downwardly from the rock shaft 58 as illustrated in dotted lines for an outer supporting arm 62 in FIG. 1.

On removal of the locking pins 43 from the lift arms 28 and 29 to open the spindle-receiving notches 38 the hydraulic cylinder assemblies 46 are extended to lower the lift arms 28 and 29 toward the platform 10 to provide for a forward gravity movement of the small reels 78 out of the notches 38 by the downhill rolling of the ends of the small spindles 39 along the inner surfaces of their associated bifurcations 37. With a pair of small reels 78 thus supported on the platform 17, they are moved forwardly until the notches 66 at the free ends of the support arms 62 and 63 are below corresponding outer ends of the spindles 39. The support arms are then elevated by the extension of the hydraulic cylinder assemblies 73 from their positions shown in dotted lines in FIG. 1 to their full line positions shown in the same figure. This elevation of the support arms 62 and 63 provides for the reception of the outer ends of the spindles 39 within corresponding notches 71 and in resting engagement on the support arms 62 and 63. The locking pins 72 are then moved to positions for closing their associated notches 71.

With the first pair of small reels 78 thus carried on the support arms 62 and 63 the lift arms 28 and 29 are lowered to their reel-loading positions indicated in dotted lines in FIG. 1 for the outer arms 28. The second pair of small reels 78 is then loaded on the lift arms 28 and 29 in all ways similar to the loading of the first pair of small reels 78 with the spindles 39 of the second pair of small reels locked by the pins 43 within the notches 38. The lift arms 28 and 29 are moved upwardly to their reel-supporting positions extended upwardly and forwardly of the platform 10.

The four small reels 78, as shown in FIG. 9, are thus supported in a balanced relation relative to the longitudinal axis of the body structure 10 so that the reels 78 in each pair thereof counterbalance each other transversely of the truck 19. Turning over of the truck as might occur due to an unbalanced loaded condition is thus prevented.

When two large reels 79 (FIG. 10) are to be loaded onto the truck 19 the center arms 29 and 63 of the mechanisms 11 and 12, respectively, are removed to provide for the centering of the reels 79 between the outer pairs of arms 28 and 62. A large reel spindle 81 is of a length to extend between the outer arms of the mechanisms 11 and 12. Except for being longer than the small reel spindles 39, the spindles 81 are constructed in all ways similar to the spindles 39 for coaction with the lift arms 28 and support arms 62.

With the first large reel 79 to be loaded being on the ground surface and centered relative to the spindle 81, the support arms 28 are moved to their loading positions as shown in dotted lines in FIG. 1 and the vehicle 19 maneuvered to locate the outer ends of the large reel spindle 81 above the curved end portions 44 of the lift arms 28. The lifting of the first large reel 79 to a position above the platform 10, its release from the outer lift arms 28 for support on the platform 10 and movement to supported positions on the outer support arms 62 of the reel-supporting mechanism 12 is accomplished in all ways similar to the loading of the first pair of small reels 78 as described in connection with FIG. 7.

With the first large reel 79 supported on the arms 62 of the mechanism 12, the reel-loading mechanism 11 is operated to pick up the second large reel 79 from a ground supported position for elevation above the platform 10 in a supported position on the outer lift arms 28. With the large reels 79 centered relative to the longitudinal axis of the truck 19 turning over of the truck because of an unbalanced loading condition is eliminated.

The reel-loading apparatus of this invention also provides for the loading of a pair of small reels 78 and a large reel 79 as illustrated in FIG. 1. From a consideration of FIGS. 1, 9 and 10, it is seen that the reel-loading apparatus provides for the positioning of large and/or small reels on the body structure 10 so that the truck 19 is evenly loaded at all times by an equal weight distribution of the reels to opposite sides of the longitudinal axis of the truck.

In the unloading of the reels 78 and/or 79, it is only necessary to reverse the loading steps described above in connection with FIGS. 9 and 10. In one embodiment of the invention each cylinder 46 is of a 5 inch diameter with a 30 inch stroke and an operating pressure of 2,000 pounds per square inch. In this embodiment, the linkage mechanisms 53 cooperate with the cylinders 46 to move the lift arms 28 and 29 through a 200° rotational movement from a reel-loading position to a position for releasing a reel onto the platform 10. The cylinders 73 are also 5 inch cylinders with each having a 10 inch stroke and capable of operating with a pressure of 2,000 pounds per square inch.

I claim:

1. An apparatus for loading small and/or large reels on a truck having a chassis comprising:

a. a body structure attachable to said chassis and including a loading platform,
   b. a first rock shaft rotatably mounted on said body structure so as to extend transversely and rearwardly of the rear end of said platform,
   c. a second rock shaft extended transversely of and rotatably mounted at the front end of said body structure at a position spaced upwardly from said platform,
   d. a series of three lift arms spaced equidistantly axially of said first rock shaft to receive a pair of small reels therebetween with the center one of said lift arms attachable to said first rock shaft at the transverse center of said frame and the outer ones of said lift arms fixedly secured to said rock shaft,
   e. means detachably mounting said center lift arm on said rock shaft,
   f. reel-engaging means at the free ends of said three lift arms,
   g. means for rocking said first rock shaft to move said three lift arms from first positions projected downwardly and rearwardly from the rear end of said frame to second positions projected upwardly and forwardly from said rear end,
   h. said center lift arm, in the loading of a large reel, being detached to provide for the large reel being centrally positioned between the outer ones of the lift arms for engagement thereby and, in the loading of a pair of small reels, being attached to the rock arm to provide for a small reel being positioned between said center lift arm and each of said outer lift arms for engagement thereby,
   i. a series of three support arms corresponding to said lift arms spaced equidistantly of said second rock shaft and including a detachable intermediate support arm,
   j. reel-engaging means at the free ends of said three support arms,
   k. means for rocking said second rock shaft to move the said three support arms from first positions projected rearwardly and downwardly from the second rock shaft to second positions projected rearwardly and upwardly from the second rock shaft,
   l. with a reel on the ground surface being engageable with said reel-engaging means on corresponding lift arms, when in the first positions therefor, and movable therewith to the second positions therefor for release from said reel-engaging means and transfer onto said platform to said support arms, when in the first positions therefor, whereby said first lift arms are free to load and support an additional reel.

* * * * *